United States Patent Office 3,433,854
Patented Mar. 18, 1969

3,433,854
UNSATURATED POLYESTER RESINS PREPARED
FROM PHOSPHORIC ACID ESTERS
Pasquale J. Apice, Cresskill, N.J., assignor to Allied
Chemical Corporation, New York, N.Y., a corporation of New York
No Drawing. Filed Oct. 8, 1964, Ser. No. 402,610
U.S. Cl. 260—869     9 Claims
Int. Cl. C08g 23/16; C08f 21/00

ABSTRACT OF THE DISCLOSURE

Flame retardant unsaturated polyesters having phosphorous incorporated into the polyester chain are prepared by reacting phosphoric acid with an alkylene oxide in a diol solvent and subsequently reacting with dicarboxylic acids and diols.

---

This invention relates to new polymerizable unsaturated polyester resin compositions and to the process for producing the same. More particularly, this invention relates to the production of unsaturated polyester resins containing phosphorus chemically bonded into the polyester chain and to fire-retardant compositions incorporating the same.

Polyester resin compositions have gained wide acceptance in recent years in numerous applications, including building materials such as architectural sheets and panels, pipes, boat hulls, car bodies, etc. To be acceptable for use in such applications, it is desirable, and in most instances necessary, that the polyester resin be fire retardant.

Numerous methods of producing fire-retardant polyester resins have been suggested. For example, flame-retardant properties have been obtained by preparing polyesters containing sufficient amounts of chlorine-substituted compounds to produce resistance to burning. However, to achieve good fire-retardant properties in a resin, excessive amounts of chlorine on the order of about 25 percent by weight or more are required. In addition to being prohibitively expensive, resin compositions containing excessive amounts of chlorine tend to degrade rapidly and become highly discolored on exposure to ultraviolet light.

Another method of achieving flame-retardant properties involves adding antimony trioxide to a chlorine-containing resin. While this method produces excellent resistance to burning, the addition of antimony trioxide in ample proportions for this purpose renders the resin opaque, thus obviating its use where transparency or light transmission is a requisite. Furthermore, other physical properties such as heat resistance are often impaired.

Still another method of increasing a resin's resistance to burning calls for the incorporation of certain phosphorus compounds such as triphenyl phosphate, tricresyl phosphate, triethyl phosphate, trixylyl phosphate, etc., into the resin composition. However, such additives in physical combination with a resin are unsatisfactory since they act as plasticizers under application of heat, thus giving the resinous composition a low heat distortion temperature.

Methods have also been suggested wherein phosphorus is chemically combined in a polymerized resin either by introducing it as a part of the polyester component or the monomeric cross-linker. However, to achieve a true chemical combination of the phosphorus in the resin, it has heretofore been necessary to utilize expensive phosphorus containing compounds. In many of the prior processes, the phosphorus containing compounds are merely solubilized rather than chemically combined in the resin composition and thus are easily removed resulting in a loss of fire retardant properties.

Accordingly, it is a primary object of the present invention to provide a polymerizable unsaturated polyester resin having phosphorus chemically bonded into or onto the polyester chain utilizing inexpensive and readily available materials.

It is a further object of the present invention to provide fire-retardant polyester resin compositions containing halogen and having phosphorus chemically bonded into or onto the polyester chain.

These and other objects and advantages of the present invention will become apparent from the detailed description set forth hereinbelow.

In accordance with the present invention an acid of phosphorus or derivative thereof is reacted with a 1,2-epoxide to form a hydroxy phosphate ester. The resulting hydroxy phosphate ester is then utilized as part of an alcoholic component which is reacted with a dicarboxylic acid and/or anhydride component preferably containing at least about 10 mol percent of an alpha-beta unsaturated compound to produce a polymerizable unsaturated polyester resin having phophorus chemically bonded therein.

Acids of phosphorus and esters thereof which are suitable for use in the present invention may be characterized as having an active hydrogen atom capable of reacting with the epoxy group of a 1,2-epoxy compound. Such a class of phosphorus compounds includes, for example, orthophosphorus acid, orthophosphoric acid, monoethyl acid phosphate, diethyl acid phosphate, alkyl and aryl phosphoric acids, substituted alkyl and aryl phosphoric acids, pyrophosphoric and pyrophosphorous acids and the like.

It is contemplated that any 1,2-epoxide capable of reacting with the above-identified phosphorus compounds would be useful in the present invention. Suitable 1,2-epoxides include, for example, ethylene oxide, propylene oxide, butylene oxides, allyl glycidyl ether, 2,4,6-trichlorophenyl glycidyl ether, epichlorohydrin, phenyl glycidyl ether, substituted phenyl glycidyl ethers, glycidol, styrene oxide, glycidyl acrylate, glycidyl methacrylate, isopropyl glycidyl ether, butyl glycidyl ether, glycidyl benzoate, glycidyl acetate, and the like.

So that the polyester resins of the present invention will contain sufficient unsaturation to promote cross-linking with a suitable polymerizable monomer containing at least one $CH_2=C<$ group, it is necessary that the dicarboxylic acid and/or anhydride component contain at least about 10 mol percent of an alpha-beta unsaturated compound such as maleic, fumaric, itaconic, citraconic, mesaconic and the like. For most commercial applications it has been found advantageous to have the proportion of alpha-beta unsaturated dicarboxylic acid and/or anhydride no lower than about 20 mol percent.

Saturated dicarboxylic acids and anhydrides which are suitable for use in combination with the above-mentioned alpha-beta unsaturated compounds include, for example, phthalic, succinic, adipic, glutaric, diglycollic, thiodiglycollic, tetrahydrophthalic, Diels-Alder adducts of cyclopentadiene and the like. In addition, various monocarboxylic acids, e.g., fatty acids and the like, may be utilized in preparing the composition of the present invention.

The alcoholic component used to formulate the polyesters of the present invention may comprise any of the conventional polyols which include, for example, ethylene glycol, propylene glycols, butylene glycols, 1,5-pentanediol, neopentyl glycol, hexylene glycols, dihydroxy polyethers such as diethylene glycol, dipropylene glycol, triethylene glycol, higher polyglycols, glycerol, cycloaliphatic diols and the like.

The preferred procedure for carrying out the present invention involves charging a suitable phosphorus-containing compound as defined above into a reaction vessel and preferably mixing the same with a glycol such as ethylene or propylene glycol or other suitable organic solvent. It is advantageous to use glycols as the solvent since they are useful in the alcoholic component which is reacted with the dicarboxylic acid and/or anhydride component thus obviating stripping off the solvent. While it is particularly desirable to carry out the reaction of the phosphorus containing acid compound and the 1,2-epoxide in the presence of a solvent, it is to be understood that satisfactory results for purposes of this invention may also be obtained in the absence thereof. The reaction vessel containing the phosphorus compound is maintained at an appropriate temperature and the 1,2-epoxide compound is added preferably either continuously or in increments over a period of time. While continuous or incremental addition of the 1,2-epoxide is advantageous since the reaction is highly exothermic at the start, all of the 1,2-epoxide may be charged at once if suitable means are provided for removing the heat generated. The amount of 1,2-epoxide used should be sufficient to permit replacement of at least one active hydrogen on each molecule of phosphorus containing acid. Of course, an excess of this amount of 1,2-epoxide may be used since such an excess will advantageously enter into the subsequent polyesterification reaction.

The temperature at which the reaction should be carried out varies depending upon the particular 1,2-epoxide used. With an alkylene oxide, such as propylene oxide, which is liquid at room temperature and highly volatile at higher temperatures, the reaction is preferably carried out at 25–30° C. or below. Other 1,2-epoxides such as glycidyl ethers require higher reaction temperatures of the order of about 50 to 200° C. To determine the temperature required for satisfactory reaction of a particular 1,2-epoxide other than the alkylene oxides, the epoxide should be heated with phosphoric acid for a period of time at progressively higher temperatures until a satisfactory rate of acid number decline is observed.

The reaction between the 1,2-epoxide and the phosphorus containing compound is continued until the acid number decline indicates that at least one hydrogen of the phosphorus containing acid has reacted. The resulting phosphate ester in combination with the alcohols which are to comprise the alcoholic component of the polyester is then heated under an inert atmosphere and the dicarboxylic acid and/or anhydride component is added thereto. It is conventional to use an alcoholic component which will provide a slight molar excess (i.e., about 5 mol percent) of hydroxyl to carboxylic acid groups in formulating polyesters. The resulting mixture is maintained at a temperature of about 100 to 210° C., until a polyester having a desired acid number is obtained. The polyester product is then cooled and thinned with from about 20 to 60 percent by weight of the total composition of a polymerizable monomer having at least one $CH_2=C<$ group. Such monomeric substances are well known in the art and include, for example, styrene, o-methyl styrene, methyl methacrylate, methyl acrylate, diallyl phthalate, diallyl oxalate, diallyl diglycolate, triallyl citrate and the like.

The resulting polymerizable composition may then be cured by heating in the presence of a peroxide catalyst as is conventional in the art. Examples of suitable peroxide catalysts include benzoyl peroxide, methyl ethyl ketone peroxide, acetyl peroxide, lauroyl peroxide, cumene hydroperoxide, t-butyl hydroperoxide, and the like.

The phosphorus containing polyesters of the present invention are particularly useful in preparing fire-retardant resin compositions. While some fire-retardancy is observed in polyester compositions containing only phosphorus, much better results are obtained by utilizing a combination of phosphorus and halogen to produce a resin having good resistance to burning. The presence of small amounts of phosphorus in the polyester composition permits a considerable reduction in the amount of halogen needed to impart satisfactory flame resistance to a resin composition. Normally, the amount of phosphorus present, based on the final copolymerized resin will vary between about 0.1 percent and 2.5 percent although amounts as low as 0.05 percent and as high as 10 percent may be usefully employed. Obviously, the amount of phosphorus required, will, among other things, depend on the amount of halogen used and the degree of fire-retardancy required.

To prepare fire-retardant polyester resin compositions having phosphorus chemically bonded into the polyester chain and containing halogen, any one or more of the reactants used may have substituted thereon one or more halogen atoms. It is preferable to utilize a halogen-substituted compound as part of the dicarboxylic acid and/or anhydride component. Suitable halogen-substituted dicarboxylic compounds include, for example, chloromaleic acid, chloromaleic anhydride, mono-, di-, tri- and tetrachloro-substituted phthalic acid and anhydride and similar bromo-substituted compounds, mono-, di-, tri- and tetrachloro-substituted isophthalic and terephthalic acid and similar bromo-substituted compounds, the adduct of maleic acid and hexachloro-cyclopentadiene ("chlorendic" or Het acids) and the like.

In addition to the halogen-substituted dicarboxylic compounds, halogen-substituted polyol reactants such as epichlorohydrin, di-, tri-, tetra-, and pentachlorophenyl glycerine ethers, and "Het" Diol may be used to incorporate halogen atoms into the resin composition. Furthermore, halogenated monomers such as chlorine-substituted styrene and diallyl phthalate may be used as a source of halogen atoms in the resin composition. Also, halogenated hydrocarbons, such as chlorinated paraffin wax, which are used as fillers and do not enter into the chemical reaction, can be used as a source of halogen.

The amount of halogen needed in a resin depends upon the degree of fire-retardancy desired and the amount of phosphorus present. As pointed out before, in the absence of any pohsphorus, halogens in an amount of 25 percent or more are required for satisfactory results. With phosphorus present in the resin composition good resistance to burning may be obtained with as little as about 7 percent halogen.

The practice of the invention is further illustrated by the following examples. The temperatures are given in degrees centigrade.

EXAMPLE 1

To a ½ liter kettle equipped with a Thermowell, agitator and reflux condenser, 62 grams of ethylene glycol and 11.5 grams of 85% $H_3PO_4$ were added. The charge was cooled with an ice water bath to a temperature of 15 to 20°. While maintaining the charge under vigorous agitation, 47 grams of propylene oxide were added dropwise over a period of 45 minutes, the temperature being maintained below 25 to 30°.

When all the propylene oxide had been added, the charge was warmed to about 75°, and had an acid number of 15 or less (indicating that essentially 2 hydrogens of $H_3PO_4$ had reacted). The reflux condenser was then replaced with suitable apparatus for removing condensate and, while maintaining the charge under an inert atmosphere, 0.06 gram of hydroquinone was added and the temperature increased. At 75°, 54 grams of molten maleic acid anhydride were added followed by 157 grams of powdered tetrachlorophthalic acid anhydride. The temperature of the charge was then maintained at 170° to 175°, until an acid number of 50 was obtained. The charge was then cooled to 90 to 100° and 125 grams of styrene monomer were added. The resultant product was a clear, lightly amber colored solution containing 70 percent solids, having a color (Hellige) of 4 to 5, an acid number of 34 and a viscosity of Z (Gardner-Holdt at 25°).

EXAMPLE 2

In a suitable apparatus as described in Example 1, 55 grams of ethylene glycol and 15 grams of orthophosphoric acid were charged and maintained under a nitrogen atmosphere with agitation while the temperature was slowly increased. At 75 to 80°, 104 grams of 2,4,6-trichlorophenyl glycidyl ether (epoxy equivalent 259) were added in small portions over a 25 to 30-minute period. At the end of this time, the temperature had risen to 97° and the reaction mixture had an acid number of about 45 indicating that essentially 1 hydrogen of $H_3PO_4$ had reacted. 40 grams of molten maleic acid anhydride were then added followed by 57 grams of tetrachlorophthalic acid anhydride and 30 grams of phthalic acid anhydride. The temperature of this mixture was increased to and maintained at about 175° until an acid number of 54 was obtained. The charge was then allowed to cool, and at 120°, 0.04 gram of hydroquinone was added. At 110°, 67 grams of diallyl phthalate were added followed by 48 grams of styrene monomer. The resultant product was a thick, slightly hazy resin.

EXAMPLE 3

Into suitable apparatus as described in Example 1, 20 grams of ethylene glycol and 12 grams of monoethyl acid ortho phosphate were charged. This charge was cooled with an ice water bath to a temperature of 10 to 20°. While maintaining the charge under a nitrogen atmosphere and agitation, 35 grams of propylene oxide were added dropwise over a 40-minute period while the temperature was maintained below 20°. 0.05 gram of hydroquinone was then added and the charge was heated until the temperature had increased to 75°, whereupon 54 grams of molten maleic acid anhydride were added followed by 157 grams of tetrachlorophthalic acid anhydride. The temperature of the charge was then maintained at 175° until an acid number of 70 was obtained. The temperature was then increased to 183 to 188° and the charge swept with nitrogen until an acid number of 50 was reached. The charge was then cooled to 95 to 105° and 149 grams of styrene monomer were added. The resultant product was a clear, lightly yellow resin having a viscosity of Z (Gardner-Holdt at 25°).

EXAMPLE 4

Into a suitable apparatus as described in Example 1, 87 grams of ethylene glycol and 15 grams of a mixture of mono- and diethyl acid orthophosphate (approximately equal molar proportions of monoesters and diesters of orthophosphoric acid) were charged under a nitrogen atmosphere. Fifteen grams of glycidol (2,3-epoxy-1-propanol) were added dropwise over a 30-minute period while maintaining the charge under suitable agitation. During the addition the temperature rose from 25° to 45°. The charge was then heated to about 85° and 0.05 gram hydroquinone, 54 grams of molten maleic acid anhydride and 157 grams of tetrachlorophthalic anhydride were added. The temperature of the charge was increased to and maintained at 175° until an acid number of 45 was obtained. The charge was then cooled to about 100° and 128 grams of styrene monomer were added. The resultant product was a clear, lightly yellow resin having a viscosity of Z (Gardner-Holdt at 25°).

The polyester resin compositions of Examples 1 to 4 were cured by heating in the presence of benzoyl peroxide (about 1% by weight of resin). The resultant cured resins were hard, lightly amber in color and transparent. These resins were tested to determine their self-extinguishing capabilities when subjected to a 3⁄4″ Bunsen burner flame for 30 seconds. Their burning rate was determined by the procedure specified in ASTM 757–49 (Globar Burning Test). The results of these tests and identical tests performed on commercially available polyester resins are shown in table below.

TABLE.—COMPARATIVE TEST DATA

| | Percent, Cl | Percent, P | Simple burning test | ASTM spec. 757–49 (in./min.) |
|---|---|---|---|---|
| Resin of experiment No. 1 | 17 | 0.7 | Self-exting. 3 sec | 0.36 |
| Resin of experiment No. 2 | 17.1 | 1.0 | do | 0.22 |
| Resin of experiment No. 3 | 16.5 | 0.7 | do | 0.35 |
| Resin of experiment No. 4 | 18.1 | 0.75 | Self-exting. immediately | 0.17 |
| "Plaskon" polyester resin 9210 | {[1] 19.8 / [2] 19.8} | 0.0 / 0.0 | Burns completely / Self-exting. 5–10 sec. | 0.52 / 0.16 |
| "Hetron" 32A (Hooker Chemical) | 25.0 | 0.0 | Self-exting. 7 sec. or longer. | 0.21 |

[1] No antimony trioxide added.
[2] 5% antimony trioxide added.

The results set forth in table clearly demonstrate that the resins prepared in accordance with the present invention exhibit fire-retardant properties comparable to resins containing antimony trioxide or excess amounts of chlorine. In addition, the resins of the present invention are transparent and more easily stabilized to ultraviolet light.

While the invention has been described in detail with particular reference to preferred embodiments thereof, many widely different variations and modifications will be apparent to those skilled in the art and it is to be understood that the invention is not to be limited except as defined in the appended claims.

I claim:

1. A polymerizable unsaturated polyester having phosphorous chemically bonded therein, said polyester comprising the reaction product of (a) an hydroxy bearing phosphate ester, (b) a diol and (c) an acid member selected from the group consisting of dicarboxylic acids, dicarboxylic anhydrides and mixtures thereof with at least 10 mol percent of said acid member being an alpha-beta unsaturated compound, said hydroxy bearing phosphate ester having previously been prepared by reacting 0.5–10 mols of a 1,2-epoxide with 1 mol of a saturated phosphorus containing compound selected from the group consisting of acids of phosphorus and esters thereof having an active hydrogen capable of reacting with the epoxy group of said 1,2-epoxide, the reaction of said 1,2-epoxide and said phosphorous containing compound being carried out in a diol solvent.

2. A polyester as claimed in claim 1 wherein said phosphorous containing compound is orthophosphoric acid.

3. A polyester as claimed in claim 1 wherein said 1,2-epoxide is propylene oxide.

4. A polyester as claimed in claim 1 wherein said acid member includes a halogen containing compound.

5. A polyester as claimed in claim 1 wherein said diol reacted with said hydroxy bearing phosphate ester and said acid member includes a halogen containing compound.

6. A polyester as claimed in claim 1 wherein said acid member comprises a mixture of maleic, phthalic and tetrachlorophthalic anhydrides.

7. A polymerizable composition comprising the polyester of claim 1 and a polymerizable monomer containing at least one $CH_2=C<$ group, said polymerizable monomer being present in an amount equal to about 20–60% by weight of the total composition.

8. A composition as claimed in claim 7 wherein said polymerizable monomer includes a halogen containing compound.

9. A composition as claimed in claim 7 wherein said polymerizable monomer is styrene.

References Cited

UNITED STATES PATENTS

| | | | |
|---|---|---|---|
| 2,372,244 | 3/1945 | Adams et al. | 260—953 |
| 2,819,247 | 1/1958 | Lundberg | 260—870 |
| 2,990,421 | 6/1961 | Mason et al. | 260—953 |
| 3,070,578 | 12/1962 | Henck et al. | 260—75 |
| 3,094,549 | 6/1963 | Gurgiolo et al. | 260—953 |
| 3,131,115 | 4/1964 | Robitschek et al. | 260—870 |
| 3,140,221 | 7/1964 | Liebling et al. | 260—870 |
| 3,205,120 | 9/1965 | Flanders | 260—953 |
| 3,317,638 | 5/1967 | Hartman et al. | 260—953 |
| 3,375,301 | 3/1968 | Case et al. | 260—869 |

FOREIGN PATENTS 1,301,645  8/1962  France.

SAMUEL H. BLECH, *Primary Examiner.*

J. T. GOOLKASIAN, *Assistant Examiner.*

U.S. Cl. X.R.

260—75, 870, 953